United States Patent
Matsuoka et al.

(10) Patent No.: US 7,103,119 B2
(45) Date of Patent: Sep. 5, 2006

(54) USE OF SMART ANTENNA IN BEAM FORMATION CIRCUIT

(75) Inventors: Hidehiro Matsuoka, Bristol (GB); Shuichi Obayashi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 814 days.

(21) Appl. No.: 10/023,712

(22) Filed: Dec. 21, 2001

(65) Prior Publication Data

US 2002/0085653 A1 Jul. 4, 2002

(30) Foreign Application Priority Data

Dec. 22, 2000 (JP) .............................. 2000-391221

(51) Int. Cl.
*H04B 7/10* (2006.01)
*H04L 1/02* (2006.01)

(52) U.S. Cl. .................... 375/347; 375/348; 375/349

(58) Field of Classification Search ................ 375/347, 375/232, 267, 149, 340, 295, 348, 349, 148, 375/265, 278; 370/210, 203; 455/276.1; 342/383
See application file for complete search history.

(56) References Cited

U.S. PATENT DOCUMENTS 5,933,421 A * 8/1999 Alamouti et al. ........... 370/330
5,973,642 A * 10/1999 Li et al. ...................... 342/378
6,249,249 B1 * 6/2001 Obayashi et al. ........... 342/371

FOREIGN PATENT DOCUMENTS

EP 0 844 765 5/1998
FR 2 698 504 5/1994

OTHER PUBLICATIONS

Wong k. k, "Adaptive Antennas at the Mobile and Base Stations in an OFDM?TDMA System", IEEE, vol. 49, No. 1, Jan. 2001.*
K-K Wong, et al., "Adaptive Antennas at the Mobile and Base Stations in an OFDM/TDMA Systems", IEEE Proceeding of Globecom, 1998, pp. 183-188.
Kai-Kit Wong, et al., "Adaptive Antennas at the Mobile and Base Stations in an OFDM/TDMA System", IEEE Transactions on Communications, vol. 49, No. 1, Jan. 2001, pp. 195-206.

* cited by examiner

Primary Examiner—Jean B. Corrielus
Assistant Examiner—Qutub Ghulamali
(74) Attorney, Agent, or Firm—Oblon, Spivak, McClelland, Maier & Neustadt, P.C.

(57) ABSTRACT

A beam formation circuit and an apparatus and a method of receiving radio frequency signals making use of a smart antenna are described in which the amount of computation tasks required for the weight calculation is significantly reduced. In realizing the directivity of the smart antenna, the output signals corresponding to a plurality of sub-carriers are weighted with a common antenna weight for each of the antenna elements.

5 Claims, 7 Drawing Sheets

USE OF SMART ANTENNA IN BEAM FORMATION CIRCUIT

CROSS REFERENCE TO RELATED APPLICATIONS

This application is based upon and claims the benefit of priority from prior Japanese Patent Application P2000-391221 filed on Dec. 22, 2000; the entire contents of which are incorporated by reference herein.

BACKGROUND OF THE INVENTION

1. Field of the Invention

The present invention relates generally to a wireless communication system in accordance with Orthogonal Frequency Division Multiplexing, and particularly to a beam formation circuit and an apparatus and a method of receiving radio frequency signals making use of a smart antenna a receiver apparatus.

2. Description of the Related Art

In recent years, with the high speed advent of the wireless communication technique, wireless terminals have been used by end users for the purpose of receiving and transmitting a large amount of information such as images, other types of data, in addition to voices. It is inevitable for high speed transmission of such a large amount of information to treat wide bandwidth signals and also to determine the measures that could be adopted to cope with signal fading and interference. On the other hand, OFDM (Orthogonal Frequency Division Multiplexing) is drawing the attention as a technique of realizing such wide bandwidth signal communications.

The OFDM technique is a block-oriented modulation scheme that maps data symbols onto a plurality of orthogonal sub-carriers separated by a distance and arranged within a limited bandwidth to provide excellent resistance characteristics against the interference due to delay spread through the multipaths. Namely, while the orthogonally encoded data signals can be generated by means of the inverse Fourier transformation or the orthogonally decoded data signals can be extracted by means of the Fourier transformation, it is possible to provide guard intervals in order to remove the influence of the timely delay within the guard intervals. Because of this, tolerability of high speed transmissions to frequency selective fading can be improved.

OFDM having such features has been expected to be applied not only to the cellular systems and the broadcast services but also applied to wireless LANs and so forth.

Figure 4:
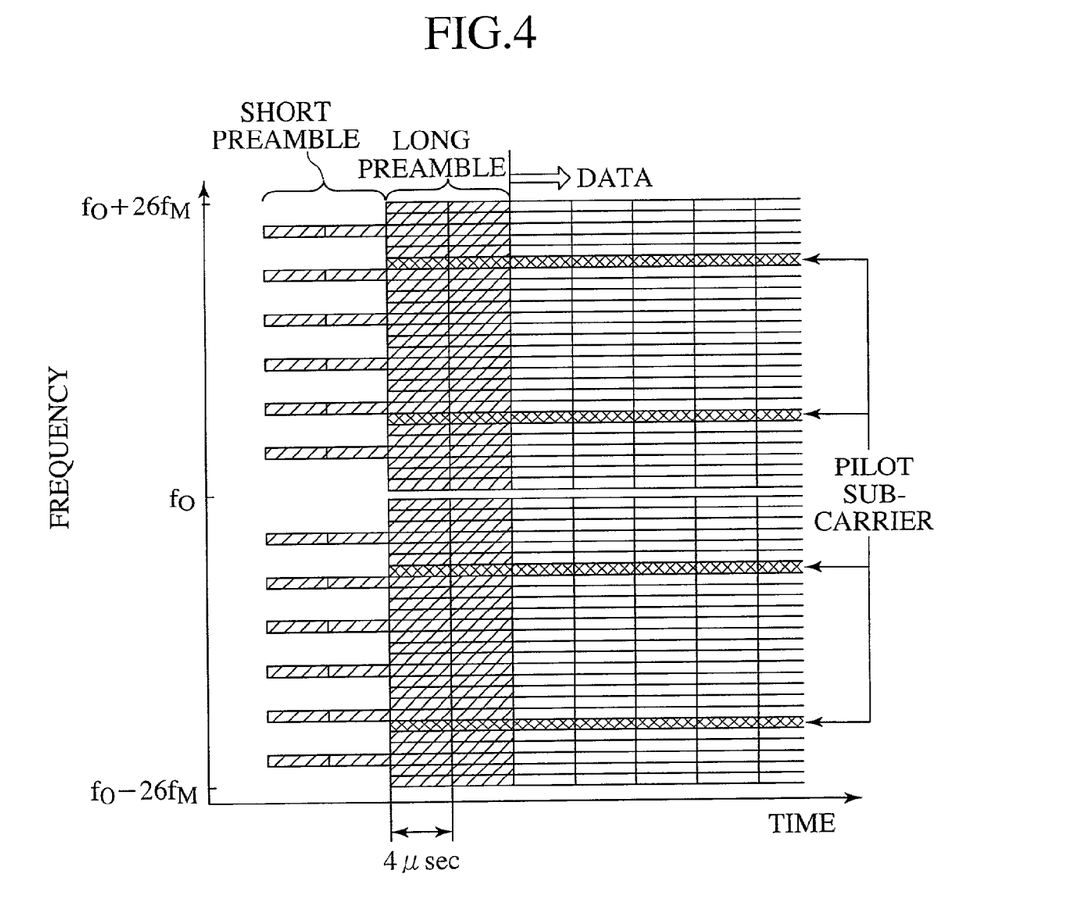
FIG. 4 is a graphic diagram showing the frequencies of the transmission signals versus time in an exemplary configuration of frames in accordance with an OFDM system.

For example, work is being done to formally standardize the wireless LAN on the basis of OFDM in Japan, Europe and U.S.A. referred to respectively as HiSWANa, HiperLAN and IEEE802.11a. These standards are similar to each other in the physical layer. Particularly, in Europe, the standard is applicable not only to the wireless LAN but also to outdoor usages. In accordance with the respective three standards, there are provided, among from a set of sub-carriers for transmission of packets, particular sub-carriers in preselected positions are used as pilot sub-carriers each of which includes a predetermined bit sequence while all the sub-carriers are provided with a predetermined leading preamble. FIG. 4 is a graphic diagram showing the frequencies of the transmission signals versus time in an exemplary configuration of frames. In this example, there are provided 52 sub-carriers in all each of which has a band width fM and provided with leading short and long preambles. Four pilot sub-carriers are included therein. One OFDM symbol time is 4 μsec.

Figure 2:
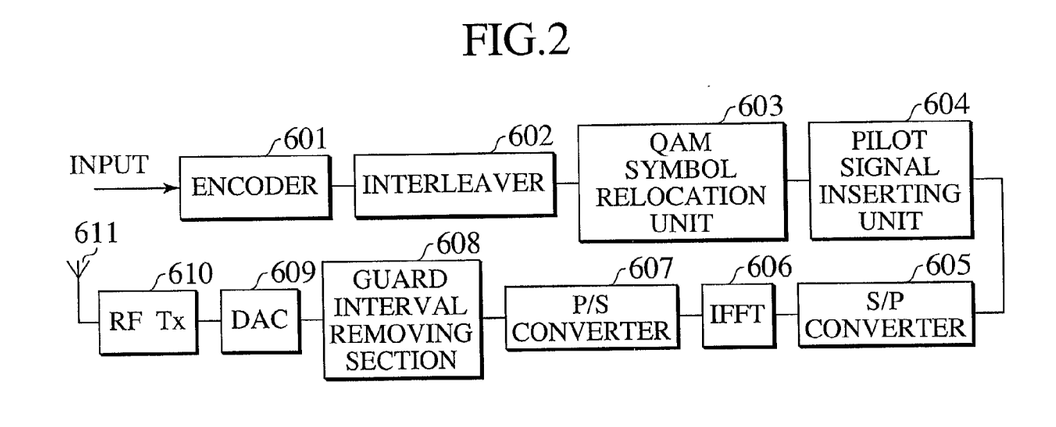
FIG. 2 is a schematic block diagram showing a transmitter apparatus in accordance with a conventional technique OFDM system.
Figure 3:
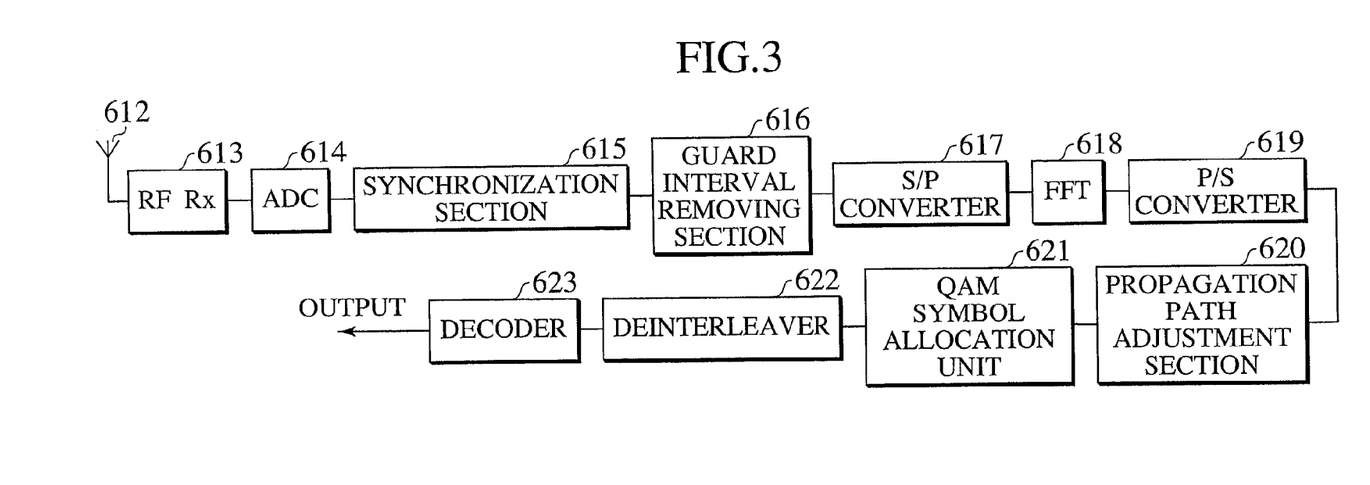
FIG. 3 is a schematic block diagram showing a receiver apparatus in accordance with a conventional technique OFDM system.

FIG. 2 and FIG. 3 is a schematic block diagram showing a transmitter apparatus in accordance with a conventional technique OFDM system. FIG. 3 is a schematic block diagram showing a receiver apparatus in accordance with a conventional technique OFDM system. These apparatuses as illustrated respectively in FIG. 2 and FIG. 3 are used in the wireless LAN as described above and have been described in details, for example, in "OFDM for wireless multimedia communications, " (Richard Van Nee, Ramjee Prasad, Artech House, 2000).

The processing of the signals by the transmitter apparatus and the receiver apparatus will be briefly explained with reference to FIG. 2 and FIG. 3. At first, in the transmitter apparatus as illustrated in FIG. 2, the data sequences to be transmitted are error corrected and encoded by means of an encoder 601 and then interchanged by means of an interleaver 602. The output signals of the interleaver 602 are converted into multi-level signals in accordance with QAM (quadrature amplitude modulation) by means of a QAM symbol relocation unit 603 followed by inserting pilot signals thereto by means of a pilot signal inserting unit 604.

Then, the QAM data sequences to be transmitted are converted into N paralell data items (N: the number of sub-carriers) by means of a serial-to-parallel converter (S/P converter) 605. The parallel data items are converted into signals in the time domain on the basis of the inverse Fourier transformation by means of the inverse fast Fourier transform unit (IFFT unit) 606 and then converted into serial data sequences by means of the parallel-to-serial converter (P/S converter) 607.

The output signals of the IFFT unit 606 are N sub-carriers as modulated by the corresponding N data items as given from the S/P converter 605. The guard interval inserting circuit 608 serves to put a wave form same as the tail portion of the effective symbols of the OFDM signal on the top of the effective symbols in the serial signals obtained after fast Fourier transformation.

The influence of the timely delay within the guard interval can be removed by the fast Fourier transformation at the receiver side. Then, the transmission signals are converted into analog signals by means of the D/A converter (DAC) 609, orthogonally modulated, frequency converted, filtered, power amplified, treated under other necessary processes, and then wireless transmitted through an antenna element 611.

It is necessary in this type of OFDM system to cope with the interference of delayed signals with delays exceeding the guard interval length, and the interference in the same channel by any other cell and any other system making use of the same frequency band. The effective use of the frequency resources is inevitable as a measure meant to work out the frequency tightness problem. It is effective as a solution of the problem to apply the so-called smart antenna technology to the OFDM system.

Figure 1:
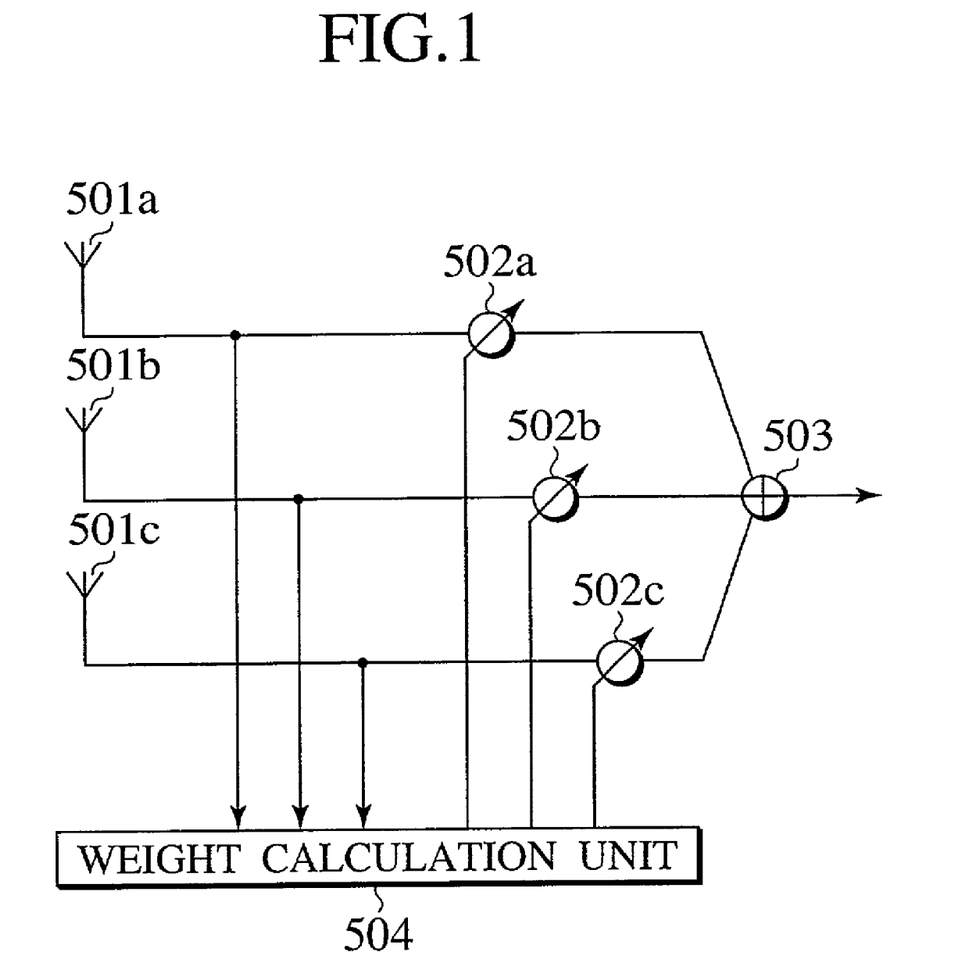
FIG. 1 is a block diagram showing the receiver apparatus provided with a smart antenna in accordance with a conventional technique.

The smart antenna technology is effective for increasing the system capacity and the coverage area of a base station and for improving the communication quality by making use of antenna elements whose directivity is variable for the base station (and the mobile station). In this case, with a plurality of antenna elements arranged in an array as illustrated in FIG. 1 rather than a single antenna element having a variable directivity, desired directivity patterns can be formed by weighting the amplitude and the phase for the respective antenna element. With this type of such an adaptive array antenna element capable of electrically controlling the directivity, it is possible not only to direct a peak in an antenna directivity pattern to any desired direction but also to direct a null to interfering waves. Particularly, it is possible to effectively use the frequency resources by forming a plurality of antenna directivity patterns orthogonal to each other (i.e, the null of one pattern to the peak of another) and assigning the same time slot and the same frequency channel to the respective beams corresponding thereto to accomplish the so-called SDMA (Space Division Multiple Access).

A plurality of tapped-delay-lines (TDL) and a plurality of weighting units for the respective antenna elements have to be provided for the smart antenna in order to form appropriate beams carrying wide bandwidth signals. Also, in the case of the OFDM system capable of separating signals in the frequency domain, weighting units provided for each sub-carrier can be used for implementing an equivalent function. In this case, however, a large amount of computation tasks are necessarily required to obtain the weights of all the sub-carriers of the OFDM system. For this reason, the excessive amounts of processing power and computation time become obstacles to the operation of the system, for example, in the case where voice signal processing is required in real time. It becomes in this case therefore necessary to increase the system in circuit size or to make use of a high speed DSP or CPU for removing the obstacles.

Furthermore, since all the sub-carriers are provided with a predetermined bit sequence having a sufficient length, the packet efficiency tends to be reduced (while this is no the case when a blind algorithm is employed). In the case of the wireless communication system as described above making use of a short preamble, it is very difficult to obtain optimal solutions on the basis of known algorithms.

BRIEF SUMMARY OF THE INVENTION

An aspect of the present invention provides a receiver apparatus provided with a smart antenna capable of adjusting its directivity by making use of a plurality of antenna elements, said receiver apparatus comprising: a plurality of Fourier transformation sections which are connected to said plurality of antenna elements and configured to output signals carried on sub-carriers orthogonal to each other from signals received by each of said antenna elements; an antenna weight calculation unit which is connected to said Fourier transformation sections and configured to extract the said signals carried on pilot sub-carriers of said sub-carriers from the output signal of said Fourier transformation sections and calculate an antenna weight of each antenna elements corresponding to each of sub-carrier groups, each sub-carrier group includes a plurality of the sub-carriers whose center frequencies are located in the vicinity of the center frequency of one of pilot sub-carrier; a plurality of weighting units which are connected to said antenna weight calculation unit and said Fourier transformation unit and configured to weight the signals of said sub-carrier groups respectively with the antenna weights as calculated by means of said antenna weight group calculation unit; and an adder circuit which is connected to said weighting units and configured to add together the signals of said sub-carrier groups as weighted with said antenna weights for each of said antenna elements.

Another aspect of the present invention provides a receiver apparatus provided with a smart antenna capable of adjusting its directivity by making use of a plurality of antenna elements, said receiver apparatus comprising: a plurality of Fourier transformation sections which are connected to said plurality of antenna elements and configured to output signals carried on sub-carriers orthogonal to each other from signals received by each of said antenna elements; a plurality of parallel-to-serial conversion sections which are connected respectively to said Fourier transformation sections and configured to perform parallel-to-serial conversion of the signals carried on said sub-carriers as Fourier transformed in a time division manner; a pilot signal extraction unit which intermittently extracts signals carried on pilot sub-carriers having a predetermined center frequencies from the output signals of said parallel-to-serial conversion section; an antenna weight calculation unit which is connected to said Fourier transformation sections and said pilot signal extraction unit and configured to calculate an antenna weight of each antenna elements corresponding to each of sub-carrier groups by the use of the signals carried on said pilot sub-carriers as extracted by said pilot signal extraction unit, each sub-carrier group includes a plurality of the sub-carriers whose center frequencies are located in the vicinity of the center frequency of one of pilot sub-carrier; a plurality of weighting units which are connected to said parallel-to-serial conversion section and said antenna weight group calculation unit and configured to multiply the output signals of said parallel-to-serial conversion section with said antenna weights as calculated by said antenna weight group calculation unit for each of the sub-carrier groups; and an adder circuit which is connected to said weighting units and configured to add together the signals of said sub-carrier groups as weighted with said antenna weights for each of said antenna elements.

A further aspect of the present invention provides a receiver apparatus provided with a smart antenna capable of adjusting its directivity by making use of a plurality of antenna elements, said receiver apparatus comprising: a plurality of weighting units which are connected to said antenna weight calculation unit and said antenna elements respectively and configured to weight the signals received by said antenna elements respectively with predetermined antenna weights; an adder circuit which is connected to said weighting units and configured to add together the output signals of said weighting units; a Fourier transformation section which is connected to said adder circuit and configured to output signals carried on sub-carriers orthogonal to each other; a pilot signal extraction unit which is connected to said Fourier transformation section and configured intermittently extract signals carried on pilot sub-carriers cyclicly appearing on the output signals of said Fourier transformation section; and an antenna weight calculation unit which is connected to said Fourier transformation unit and said weighting units and configured to receive said signals carried on said sub-carriers, calculate antenna weights corresponding respectively to said antenna elements to form an antenna directivity pattern and output said antenna weights to said weighting units.

A still further aspect of the present invention provides a method of receiving radio frequency signals by the use of a smart antenna capable of adjusting its directivity by making use of a plurality of antenna elements, said method comprising: a step of calculating antenna weights with reference to predetermined pilot sub-carrier signals which are extracted from the received signal as Fourier transformed; a step of weighting the signals as Fourier transformed with said antenna weights in order that a group of the sub-carrier signals is weighted with common antenna weights as calculated with reference to at least one pilot sub-carrier signals belonging to said group.

A still further aspect of the present invention provides a method of receiving radio frequency signals by the use of a smart antenna capable of adjusting its directivity by making use of a plurality of antenna elements, said method comprising: a step of intermittently extracting pilot sub-carrier signals from a serial signal containing a time series data sequence as Fourier transformed; a step of calculating antenna weights for each of sub-carrier groups with reference to a pilot sub-carrier signal of said pilot sub-carrier signals which belong to said each of sub-carrier group; and a step of weighting said serial signal containing a time series data sequence by timely switching said antenna weights corresponding to said sub-carrier group.

A still further aspect of the present invention provides a method of receiving radio frequency signals by the use of a smart antenna capable of adjusting its directivity by making use of a plurality of antenna elements, said method comprising: a step of weighting signals separately received by said antenna elements respectively with antenna weights; a step of intermittently extracting pilot sub-carrier signals from a serial signal containing a time series data sequence as Fourier transformed; and a step of calculating antenna weights for said respective antenna elements with reference to said pilot sub-carrier signals as intermittently extracted.

A still further aspect of the present invention provides a beam formation circuit comprising: an input section which is configured to receive signals as digitized after received by antenna elements respectively; a pilot signal extraction unit which is connected with said input section and configured to intermittently extract pilot sub-carrier signals from said signals received through said input section; an antenna weight calculation unit which is connected to said pilot signal extraction unit and configured to calculate an antenna weight of each antenna elements corresponding to each of sub-carrier groups, each sub-carrier group includes a plurality of the sub-carriers whose center frequencies are located in the vicinity of the center frequency of one of said pilot sub-carrier; a plurality of weighting units which are connected to said antenna weight calculation unit and said antenna elements respectively and configured to weight the signals received by said antenna elements respectively with said antenna weights as calculated by said antenna weight group calculation unit; an adder circuit which is connected to said weighting units and configured to add together the signals of said sub-carrier groups as weighted with antenna weights for each of said antenna elements; and a timing controlling unit which is connected to said pilot signal extraction unit and said antenna weight group calculation unit and configured to supply timing signals to said pilot signal extraction unit and said antenna weight group calculation unit.

A still further aspect of the present invention provides a receiver apparatus for a wireless communication system on the basis of an orthogonal frequency division multiplexing modulation making use of a plurality of sub-carriers orthogonal to each other in a frequency domain, said receiver apparatus comprising: a plurality of antenna elements which are configured to separately receive OFDM signals as modulated in accordance with said orthogonal frequency division multiplexing modulation; a plurality of Fourier transformation circuits which are connected respectively to said plurality of antenna elements and configured to perform Fourier transformation of said OFDM signals as received by each of said antenna elements and output signals carried on said sub-carriers; an antenna weight calculation unit which is connected to said Fourier transformation circuits and configured to receive the signals carried on said sub-carriers and calculate antenna weights corresponding respectively to said antenna elements to form an antenna directivity pattern; and a plurality of weighting units which are connected to said antenna weight calculation unit and said Fourier transformation unit and configured to weight the output signals of said Fourier transformation unit corresponding to the OFDM signals received by said antenna elements on the basis of said antenna weights as calculated by means of said antenna weight calculation unit, wherein the output signals corresponding to a plurality of said sub-carriers are weighted with a common antenna weight for each of said antenna elements.

A still further aspect of the present invention provides a receiver apparatus for a wireless communication system on the basis of an orthogonal frequency division multiplexing modulation making use of a plurality of sub-carriers orthogonal to each other in a frequency domain, said receiver apparatus comprising: a plurality of antenna elements which are configured to separately receive OFDM signals as modulated in accordance with said orthogonal frequency division multiplexing modulation; a plurality of weighting units which are connected to said antenna elements and configured to weight the OFDM signals received by said antenna elements; a Fourier transformation circuit which is connected to said weighting units and configured to perform Fourier transformation of said OFDM signals as weighted by means of said weighting units and output signals carried on said sub-carriers; and an antenna weight calculation unit which is connected to said Fourier transformation unit and said weighting units and configured to receive said signals carried on said sub-carriers as Fourier transformed by said Fourier transformation circuit, calculate antenna weights corresponding respectively to said antenna elements to form an antenna directivity pattern and output said antenna weights to said weighting units, wherein the OFDM signals corresponding to a plurality of said sub-carriers are weighted with a common antenna weight for each of said antenna elements.

DETAILED DESCRIPTION OF THE INVENTION

In the followings, various embodiments of the present invention will be described with reference to the accompanying drawings.

While there are illustrated only three signal reception systems each comprising an antenna element and associated circuits required for receiving and processing three sub-carriers groups each of which consists of three sub-carriers, totaling to six sub-carriers, this is made only for the sake of clarity in explanation so that it is possible to apply the present invention to any other number of the sub-carriers and any other number of the sub-carrier groups with equivalent advantages.

Also, while the FFT can be implemented on the basis of the Discrete Fourier transformation (DFT) scheme, the actual implementation is not limited to.

Figure 5:
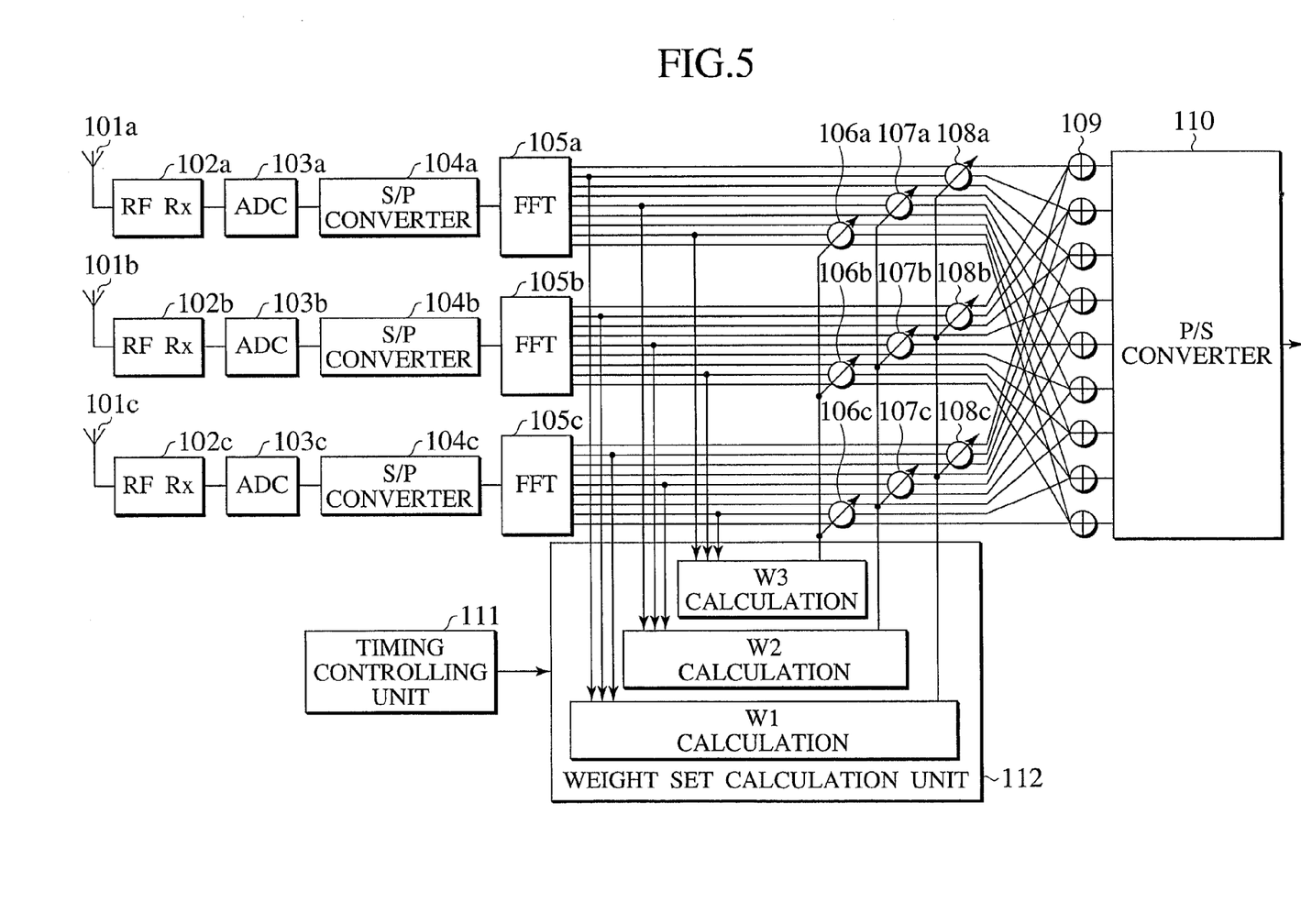
FIG. 5 is a block diagram showing the receiver apparatus provided with a smart antenna in accordance with a first embodiment of the present invention.

The operation of a first embodiment in accordance with the present invention will be explained. FIG. 5 is a block diagram showing the receiver apparatus provided with a smart antenna in accordance with the first embodiment of the present invention. The receiver apparatus is provided with high frequency wave reception circuits 102a to 102c, A/D converters 103a to 103c, S/P converters 104a to 104c, FFT units 105a to 105c, weighting units 106a to 108a, 106b to 108b and 106c to 108c, adder circuits 109, a P/S converter 110, a timing controlling unit 111 and a weight set calculation unit 112. At first, the OFDM signals as received by the antenna elements 101a to 101c are filtered, low-noise amplified, frequency converted and so forth at a wireless frequency band, and then filtered, orthogonally demodulated, automatic gain controlled (AGC) and so forth at a medium frequency band by means of the high frequency wave reception circuits 102a to 102c, followed by conversion to digital signals by means of the A/D converters 103a to 103c. The digital signals are serial-to-parallel converted by the S/P converters 104a to 104c in order to transfer them to the FFT units 105a to 105c serving to perform the Fourier transformation of the digital signals. By this configuration, the individual signal sequences distributed and transmitted over the orthogonal frequency band are separated corresponding to the respective sub-carriers.

In this case, if the frequency band of the respective sub-carriers is relatively wide, the antenna directivity patterns are dispersed due to dispersion of the center frequencies of the distant sub-carriers in the case where a single antenna weight is applied to the respective one antenna element for all the sub-carriers, and thereby the characteristics tends to be lowered because of the decrease in the beam gain to the desired direction and because a null is hardly formed to interfering waves. On the other hand, however, a large amount of computation tasks are necessarily required to obtain the weights of all the sub-carriers of the OFDM system. For this reason, the sub-carriers are grouped into sub-carrier groups. Each sub-carrier group includes a plurality of sub-carriers having center frequencies located within a certain frequency width within which the dispersion of the antenna directivity patterns is negligible.

For example, when the nine sub-carriers are called S1, S2, . . . and S9 in the order from the high frequency sub-carrier in the case of the present embodiment while the sub-carriers S2, S5 and S8 are pilot sub-carriers containing known bit sequences, it is possible to define a sub-carrier group containing the sub-carriers S1 to S3, a sub-carrier group containing the sub-carriers S4 to S6 and a sub-carrier group containing the sub-carriers S7 to S9. Also, the antenna weights W1, W2 and W3 to be given respectively to these sub-carrier groups are calculated by means of the weight set calculation unit 112 with reference only to the pilot sub-carriers S2, S5 and S8. In this case, the timing controlling unit 111 serves to detect the input/output signal timing at the FFT units 105a to 105c and to control the signal timing required for calculating the antenna weights in the weight set calculation unit 112. Timing control signals are transmitted to the weight set calculation unit 112 from the timing controlling unit 111 in order to extract the output signals of the same time points at the respective signal reception systems. The antenna weights W1, W2 and W3 as calculated by the weight set calculation unit 112 are multiplied by the outputs of the FFT units 105a to 105c respectively by means of the weighting units 106a to 108a, 106b to 108b and 106c to 108c, and then the results of multiplication corresponding to each sub-carrier and each antenna element are added together by means of the adder circuits 109.

Finally, the signals as obtained by combining signals on the respective sub-carriers given the weights are converted into a serial signal containing a time series data sequence by means of the P/S converter 110. By this configuration, an appropriate antenna directivity pattern is obtained for each sub-carrier. While the signals on the pilot sub-carriers containing known bit sequences can be used in the weight set calculation unit 112, the foregoing technique is applicable not only to beam formation algorithms on the basis of blind algorithms but also to beam formation algorithms on the basis of MMSE (Minimum Mean Square Error) such as LMS (Least Mean Squares), SMI (Sample Matrix Inverse), RLS (Recursive Least Square) and so forth.

In the case of the receiver apparatus making use of the smart antenna in accordance with the present embodiment as described above, it is possible to reduce the amount of computation tasks required for the weight set calculation since there is no need for calculating the weights for all the sub-carriers while one set of the weights is calculated for a plurality of sub-carriers belonging to each sub-carrier group. By this configuration, it becomes possible to process signals in real time without resort to a high speed DSP or CPU and without resort to increasing the scale of circuitry.

Also, the directivity control mechanism is not depending upon a particular modulation scheme or a particular error correction encoding system but applicable to any type thereof.

Furthermore, it should be noted that an appropriate number of the sub-carriers belonging to one antenna element group is depending upon the band width of the sub-carriers and the OFDM carrier frequencies and therefore may be determined taking into consideration the tradeoff made between the error ratio after decoding and the amount of computation tasks for obtaining a weight set.

Figure 6:
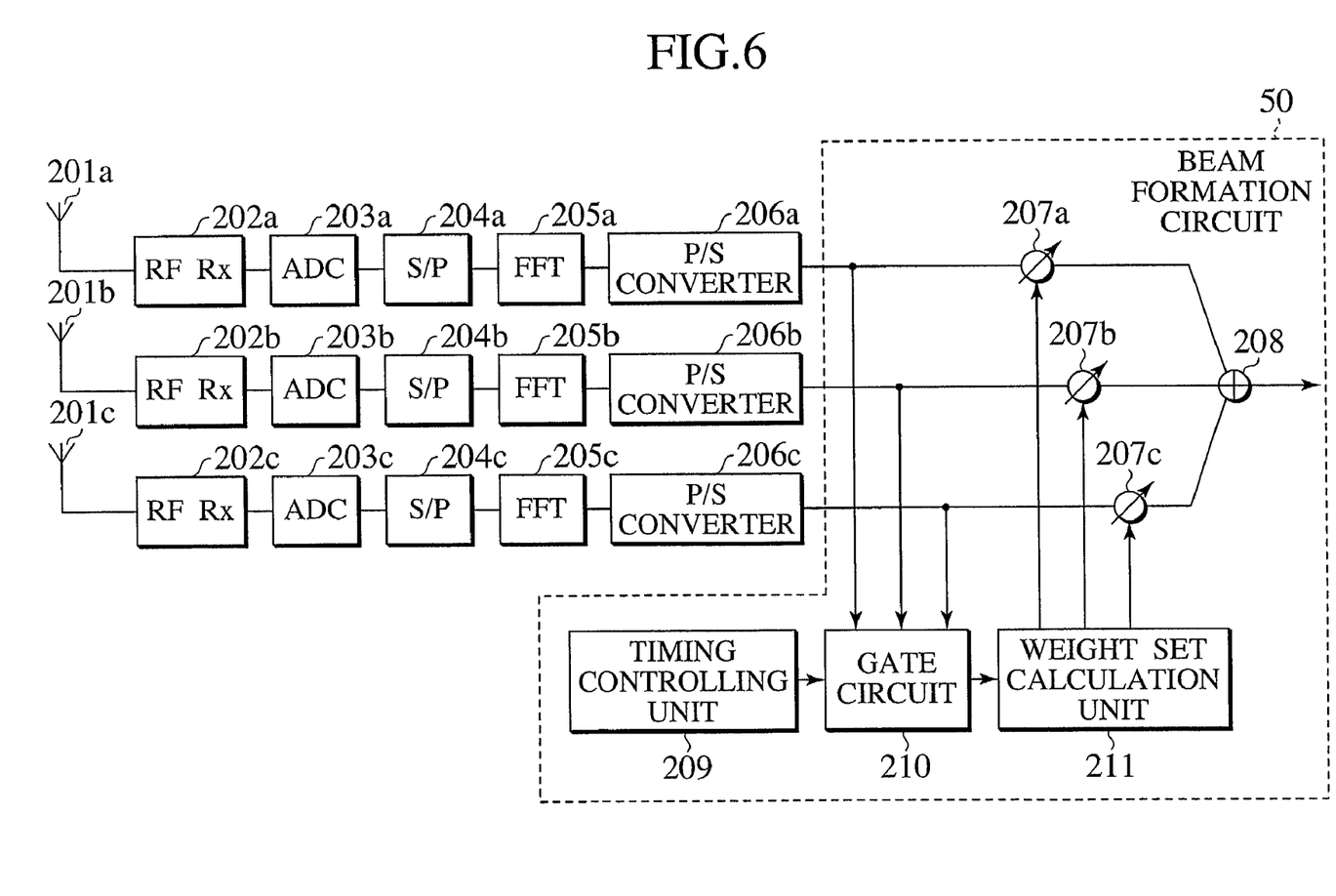
FIG. 6 is a block diagram showing the receiver apparatus provided with a smart antenna in accordance with a second embodiment of the present invention.

FIG. 6 is a block diagram showing the receiver apparatus provided with a smart antenna in accordance with a second embodiment of the present invention. The receiver apparatus of the present embodiment is provided with antenna elements 201a to 201c, high frequency wave reception circuits (RF RX) 202a to 202c serving to perform necessary processes of wireless frequency signals as received, i.e., filtering, low-noise amplification, frequency conversion and so forth, orthogonally demodulation and so forth, A/D converters (ADC) 203a to 203c for converting analog signals at the base band frequency to digital signals, FFT units 205a to 205c for performing the fast Fourier transformation of the digital signals, S/P converters 204a to 204c for performing serial-to-parallel conversion of the digital signals in advance of the FFT unit 205a to 205c, P/S converters 206a to 206c for performing parallel-to-serial conversion of the digital signals after the FFT unit 205a to 205c, a pilot signal extraction unit (Gate circuit) 210 for intermittently extracting signals on the pilot sub-carriers from the output signals of the FFT units, a timing controlling unit 209 for serving to detect the input/output signal timing at the FFT units 105a to 105c and to control the signal timing required for extracting signals on the pilot sub-carriers from the output signals of the FFT units, a weight set calculation unit 211 for calculating the antenna weights for each sub-carrier by the use of the pilot signals as extracted and the preamble signals, weighting units 207a to 207c for weighting signals of each sub-carrier group with the corresponding antenna weight set in a time division manner, and an adder circuit 208 for adding together the received signals of the three paths.

Next, the operation of the second embodiment in accordance with the present invention when signals are being received will be explained. At first, the OFDM signals as received by the antenna elements 201a to 201c are filtered, low-noise amplified, frequency converted and so forth at a wireless frequency band, and then filtered, orthogonally demodulated, automatic gain controlled (AGC) and so forth at a medium frequency band by means of the high frequency wave reception circuits 202a to 202c, followed by conversion to digital signals by means of the A/D converters 203a to 203c. The digital signals are serial-to-parallel converted by the S/P converters 204a to 204c in order to transfer them to the FFT units 205a to 205c serving to perform the Fourier transformation of the digital signals, which are then converted into a serial signal containing a time series data sequence corresponding to each antenna element by means of the P/S converters 206a to 206c. By this configuration, the individual signal sequences transmitted over the orthogonal frequency band are separated corresponding to the respective sub-carriers and outputted in a time division manner in which the individual signal sequences appear in turn.

On the other hand, the pilot signal extraction unit 210 serves to intermittently extract signals on the pilot sub-carriers from the output signals of the FFT units whereas the weight set calculation unit 211 serves to calculate an appropriate antenna weight set for each sub-carrier group in order to form a desired directivity pattern. In this case, the timing controlling unit 209 serves to detect the input/output signal timing at the FFT units and to control the signal timing required for extracting signals on the pilot sub-carriers from all the output signals of the FFT units. Also, the respective antenna weights are calculated on the basis of one of a variety of beam formation algorithms in the same manner as in the first embodiment of the present invention.

The antenna weight sets as calculated are multiplied by the respective received signals by means of the weighting units 207a and combined together by means of the adder circuit 208. By this configuration, signals are obtained with a desired antenna directivity pattern for each sub-carriers.

Particularly, the characterizing feature of the present embodiment resides in the pilot signal extraction unit 210 serving to intermittently extract pilot signals on the pilot sub-carriers from the serial signals obtained by parallel-to-serial conversion after fast Fourier transformation of the sub-carriers containing data signals and the pilot signal. In what follows, the operation of the pilot signal extraction unit 210 will be explained.

Figure 7:
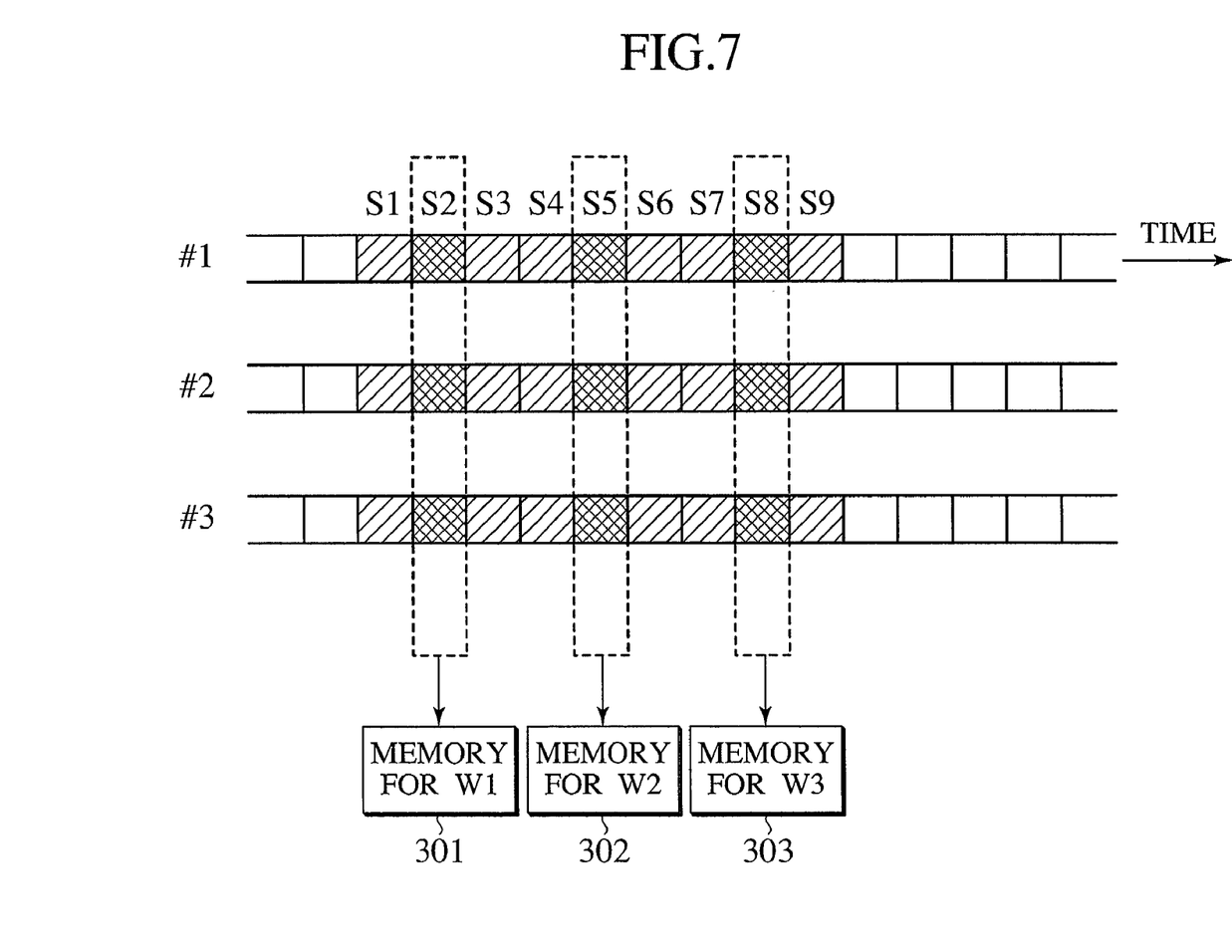
FIG. 7 is a schematic diagram showing the mechanism of the pilot signal extraction unit as illustrated in FIG. 6.

FIG. 7 is a schematic diagram showing the mechanism of the pilot signal extraction unit 210 as described above. The output signals of the P/S converters 206a to 206c are successively output in a time sequence in which the OFDM symbols of the respective the sub-carriers are arranged one after another with a symbol rate 9 times higher than the original symbol rate. The pilot signal extraction unit 210 is configured to extract for each antenna element only the symbols as transferred on the pilot sub-carriers when a set of 9 symbols related to the same time slot are inputted to the pilot signal extraction unit 210. For this purpose, the timing controlling unit 209 serves to transfer synchronization clocks indicative of the output timing of the respective OFDM symbols together with the timing information about the position of the symbols on the pilot sub-carriers in the respective OFDM symbols.

For example, like the first embodiment of the present invention, when the nine sub-carriers are called S1, S2, . . . and S9 in the order from the high frequency sub-carrier while the sub-carriers S2, S5 and S8 are pilot sub-carriers containing known bit sequences, the output signals of the P/S converters 206a to 206c are successively outputted with one symbol of the pilot signals after each other two data symbols in a time sequence. The pilot signals as extracted are temporarily stored in the memories 301 to 303 for the purpose of calculation of the respective weight sets. Also, when the weights are multiplied, the timing controlling unit 209 serves to take control of the operation timing of the weight set calculation unit 211 in order that the weight set as used is switched for each sub-carrier group in a cyclic manner while the weights of the weight set are transferred from the weight set calculation unit 211 respectively to the weighting units 207a to 207c.

Accordingly, in the case of the receiver apparatus making use of the smart antenna in accordance with the present embodiment as described above, it is possible to substantially reduce the amount of computation tasks required for the weight set calculation since pilot signals on the pilot sub-carriers are intermittently extracted from the serial signals obtained by parallel-to-serial conversion after fast Fourier transformation of the sub-carriers containing data signals and the pilot signals and then used for calculating the weights for the sub-carrier groups in order to optimally weight the serial signals corresponding to the antenna elements 201a to 201c.

Furthermore, in the case of the receiver apparatus making use of the smart antenna in accordance with the present embodiment, it is also possible to reduce the number of signal lines required of the beam formation circuit for weighting as encircled by broken line as illustrated in FIG. 6. The beam formation circuit can be of an applique type as a functional circuit LSI chip for smart antennas separate from LSIs functioning as FFT units, decoding circuitry and so forth to reduce the cost. Still further, in the case of the receiver apparatus making use of the smart antenna in accordance with the present embodiment, it becomes easy to regroup the sub-carrier groups by changing the timing of extraction of the sub-carrier signals by the pilot signal extraction unit 210 and the timing of the transfer of the weight sets for the respective sub-carrier groups from the weight set calculation unit 211. Still further, in the case of the receiver apparatus making use of the smart antenna in accordance with the present embodiment, it is also possible to reduce the process rate by sampling the signals on part of the pilot sub-carriers rather than extracting the signals on all the pilot sub-carriers of all the antenna elements while appropriately adjusting the timing control signals as given from the timing controlling unit 209 to the pilot signal extraction unit 210. This is possible also in the case of the receiver apparatus making use of the smart antenna in accordance with the first embodiment of the present invention by adjusting the timing control signals as given from the timing controlling unit 111 to the weight set calculation unit 112. This is particularly effective when there is limitation on the hardware size for implementing the pilot signal extraction unit 210 or the subsequent weight set calculation unit 211 while a substantial time is need for calculating weights. Also, it is possible to lower the frequency of the operating clock signal of a DSP or a CPU and therefore to have the advantage of lower power consumption and lower costs.

Figure 8:
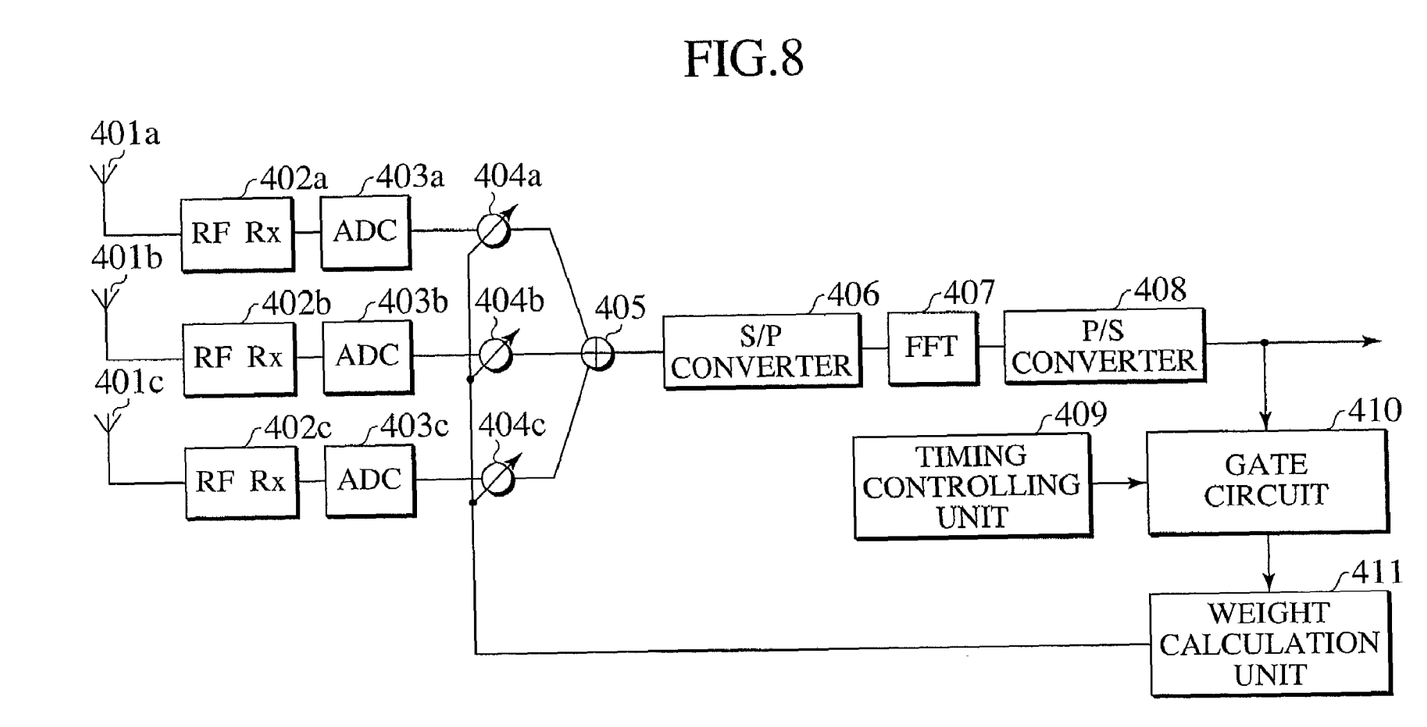
FIG. 8 is a block diagram showing the receiver apparatus provided with a smart antenna in accordance with a third embodiment of the present invention.

FIG. 8 is a block diagram showing the receiver apparatus provided with a smart antenna in accordance with a third embodiment of the present invention. The receiver apparatus of the present embodiment is provided with antenna elements 401*a* to 401*c*, high frequency wave reception circuits (RF RX) 402*a* to 402*c* serving to perform necessary processes of wireless frequency signals as received, i.e., filtering, low-noise amplification, frequency conversion and so forth, orthogonally demodulation and so forth, weighting units 404*a* to 404*c* for weighting signals of the sub-carriers with the corresponding antenna weights, an adder circuit 405 for combining together the signals of the three paths as weighted, an S/P converter 406 for converting the combined signals as weighted into the parallel signals, an FFT unit 407 for performing the fast Fourier transformation of the parallel signals, a P/S converter 408 for converting the parallel signals after the fast Fourier transformation into the serial signals, a timing controlling unit 409 for detecting the input/output signal timing at the FFT units and controlling the signal timing required for extracting signals on the pilot sub-carriers from the output signals of the FFT units, a pilot signal extraction unit (Gate circuit) 410 for intermittently extracting signals on the pilot sub-carriers from the output signals of the FFT units, and a weight calculation unit 411 for calculating the antenna weights for each sub-carrier.

Next, the operation of the third embodiment in accordance with the present invention will be explained. At first, the OFDM signals as received by the antennas 401*a* to 401*c* are filtered, low-noise amplified, frequency converted and so forth at a wireless frequency band, and then filtered, orthogonally demodulated, automatic gain controlled (AGC) and so forth at a medium frequency band by means of the high frequency wave reception circuits 402*a* to 402*c*, followed by weighting the signals of the respective antenna elements with weights as calculated for the respective antenna elements and combining the signals as weighted by means of the adder circuit 405. Particularly, in this embodiment of the present invention, a single antenna weight is given to one antenna element. Namely, all the sub-carriers as received by the same antenna element is given the same antenna weight.

Thereafter, the received signals as weighted is fast Fourier transformed by means of the FFT unit 407 in order to output sequential signals with an appropriate antenna directivity pattern. On the other hand, the pilot signal extraction unit 410 serves to intermittently extract pilot signals on the pilot sub-carriers and known preamble signals on the respective sub-carriers from the output signals of the FFT unit 407 while the weight calculation unit 411 serving to calculate antenna weights. In this case, the timing controlling unit 409 serves to detect the input/output signal timing at the FFT unit and to control the signal timing required for extracting signals on the pilot sub-carriers from the output signals of the P/S converter 408. The antenna weights are calculated at the initial stage with reference to the preamble signals successively contained in the sequential signals after the fast Fourier transformation as initial weights and then updated with reference to the pilot sub-carrier signals cyclicly contained in the sequential signals in order to track timely variation of the propagation condition of the carrier waves. The antenna weights as obtained are multiplied respectively by the received signals by means of the weighting units 404*a* to 404*c* in advance of the FFT unit.

More specifically speaking, a plurality of sets of the antenna weights are switchingly given to the antenna elements followed by comparing a plurality of antenna directivity patterns as calculated from the pilot signals on the pilot sub-carriers and the known preamble signals on the respective sub-carriers extracted from the output signals corresponding to the different sets in order to determine the antenna weights of an optimal one of the antenna directivity patterns by means of the weight calculation unit 411.

In the case of the receiver apparatus making use of the smart antenna in accordance with the present embodiment as described above, it is possible to reduce the amount of computation tasks required for the weight set calculation since only a single antenna weight is calculated for each antenna element while the received signals are fast Fourier transformed after weighting with the antenna weights for the respective antenna elements followed by extracting the pilot signals for weight calculation. Also, it is possible to reduce the hardware size since there are needed a smaller number of multiply arithmetic circuits and adder circuits for weighting and combining the received signals from the respective antenna elements and needed only a single FFT unit for fast Fourier transformation. Furthermore, since the weight as used need not be switched for each antenna elements, it is possible to furthermore reduce the hardware size since the timing control is simplified and implemented only with a simply timing control circuit.

However, it is required for effectively using this embodiment of the present invention that the propagation condition of the carrier waves is a static condition where few interfering waves and multipaths exist or that the band width of the OFDM system is no wider than the band width of the propagation condition in which the coherence of the sub-carriers is maintained. When the requirement is satisfied, the smart antenna in accordance with the present embodiment is effective to reduce the amount of computation tasks required for calculating weights and to reduce the hardware size for implementing the system since the dispersion of optimal antenna directivity patterns due to the dispersion of the center frequencies of the sub-carriers is negligible irrespective of the number of the sub-carriers even if only a signal antenna directivity pattern is used for each antenna element.

Also, in this embodiment of the present invention, the weighting units 404*a* to 404*c* and the adder circuit 405 serve to weight and combine the digital signals. However, it is possible to perform weighting and combining analog signals. For example, when analog signals are weighted and combined, the weighting units 404*a* to 404*c* can be implemented with phase shifters and amplifiers (attenuators) while the A/D converters 403*a* to 403*c* are placed after the weighting units 404*a* to 404*c*.

As explained above in details, in accordance with the embodiments of the present invention as explained heretofore, the antenna weights are calculated with reference to the pilot sub-carrier signals as outputted from the FFT units and are used for weighting the sub-carrier signals in order that the respective sub-carrier signals belonging to each predetermined sub-carrier group are weighted with the same weight. It is therefore possible to reduce the amount of computation tasks required for the weight set calculation since there is no need for calculating the weights for all the sub-carriers.

Also, in accordance with the second embodiment of the present invention, the hardware configuration can be simplified by extracting the pilot signals for calculating antenna weights and weighting/combining the received signals after the fast Fourier transformation in a time sequential manner. Furthermore, in this case, it is also possible to reduce the number of signal lines required of the beam formation circuit for weighting as encircled by broken line as illustrated in FIG. 6. The beam formation circuit can be of an applique type as a functional circuit LSI chip for smart antennas separate from LSIs functioning as FFT units, decoding circuitry and so forth to reduce the cost.

Alternatively, by placing the circuitry for weighting/combining the received signal in advance of the fast Fourier transformation, it is possible to reduce the number of multiply arithmetic circuits and adder circuits for weighting and combining the received signals and the number of the FFT units for fast Fourier transformation. Furthermore, in accordance with the third embodiment of the present invention, since the number of antenna weights to be calculated is equal to the number of the antenna elements irrespective of the number of the sub-carriers, it is possible to reduce the amount of computation tasks required for the weight calculation.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A receiver apparatus provided with a smart antenna capable of adjusting a directivity of the smart antenna by making use of a plurality of antenna elements, said receiver apparatus comprising:

a plurality of Fourier transformation sections which are connected to said plurality of antenna elements and configured to output signals carried on sub-carriers orthogonal to each other from signals received by each of said antenna elements;

a plurality of parallel-to-serial conversion sections which are connected respectively to said Fourier transformation sections and configured to perform parallel-to-serial conversion of the signals carried on said sub-carriers as Fourier transformed in a time division manner;

a pilot signal extraction unit which intermittently extracts signals carried on pilot sub-carriers having predetermined center frequencies from the output signals of said parallel-to-serial conversion sections;

an antenna weight calculation unit which is connected to said Fourier transformation sections and said pilot signal extraction unit and configured to calculate an antenna weight of each antenna elements corresponding to each of sub-carrier groups by the use of the signals carried on said pilot sub-carriers as extracted by said pilot signal extraction unit, each sub-carrier group including a plurality of the sub-carriers whose center frequencies are located in a vicinity of a center frequency of one pilot sub-carrier;

a plurality of weighting units which are connected to said plurality of parallel-to-serial conversion sections and said antenna weight calculation unit and configured to multiply the output signals of said plurality of parallel-to-serial conversion sections with said antenna weights as calculated by said antenna weight calculation unit for each of the sub-carrier groups;

an adder circuit which is connected to said weighting units and configured to add together the signals of said sub-carrier groups as weighted with said antenna weights for each of said antenna elements; and a timing controlling unit which is connected to said pilot signal extraction unit and said antenna weight calculation unit and configured to supply timing signals to said pilot signal extraction unit and said antenna weight calculation unit in order that said antenna weight of each antenna elements is switched for each said sub-carrier group in a cyclic manner.

2. The receiver apparatus as claimed in claim 1, wherein said weighting units are configured to receive the signals on said sub-carriers as output from said Fourier transformation sections in parallel and weight the parallel signals as output from said Fourier transformation sections in parallel.

3. The receiver apparatus as claimed in claim 1, wherein said antenna elements and said Fourier transformation sections are connected through high frequency wave reception circuits which are configured to perform at least filtering, low noise amplification and frequency conversion.

4. The receiver apparatus as claimed in claim 3, wherein said high frequency wave reception circuits and said Fourier transformation sections are connected through analog-to-digital converters which are configured to convert analog signals output from said high frequency wave reception circuits to digital signals and transfer said digital signals to said Fourier transformation sections.

5. The receiver apparatus as claimed in claim 4, wherein said analog-to-digital converters and said Fourier transformation sections are connected through a serial-to-parallel converter which is configured to convert serial signals output from said analog-to-digital converters to parallel signals and transfer said parallel signals to said Fourier transformation sections.

* * * * *